Oct. 13, 1964     M. J. P. WOHLERS     3,152,765
LIGHT PROJECTOR
Filed Aug. 18, 1961

INVENTOR
MARCEL J.P. WOHLERS
By Emery L. Groff Jr.
Atty 3,152,765
LIGHT PROJECTOR
Marcel J. P. Wohlers, La Conversion, near Lausanne, Switzerland, assignor to Infranor S.A., Geneva, Switzerland, a corporation of Switzerland
Filed Aug. 18, 1961, Ser. No. 132,343
Claims priority, application Switzerland, Aug. 20, 1960, 9,470/60
2 Claims. (Cl. 240—41.35)

Vapour lamps of Hg at high pressure have an output and a duration of life considerably greater than incandescent lamps, and it is advantageous to use these lamps for projectors.

These lamps are usually provided with a fluorescent balloon of large dimensions having the advantage of correcting the colour of the light without reducing the luminous flux. However, this advantage is at a minimum in comparison with the inconveniences which are presented by a luminous source of large dimensions as is thus the case; it is not, in fact, possible to direct the light of such a source without employing projectors of excessive size and it is never possible to eliminate the direct light which falls outside the principal beam.

In particular, these lamps with a fluorescent balloon, however, do not permit of realising a projector producing a substantially uniform lighting on a rectangular surface, as is often desired, for example for the lighting of facades of an edifice or of a place of sport.

The present invention has for its object a projector giving a substantially uniform lighting on a rectangular surface, characterised in that it comprises a luminous source assimilable to a segment of straight line perpendicular to the optical axis of the projector, said latter comprising a reflecting cylindrical cavity, located behind the luminous source and of which the generatrices are parallel to the axis of the luminous source, two reflectors also cylindrical, the generatrices of which are parallel to the axis of the source, these reflectors being disposed on opposite sides of the optical axis of the projector, and two lateral reflectors disposed near each extremity of the luminous source and connected to the lateral edges of the cylindrical reflectors.

One form of construction and modifications of the projector, object of the invention, are shown diagrammatically and by way of example in the accompanying drawing.

Figure 1:
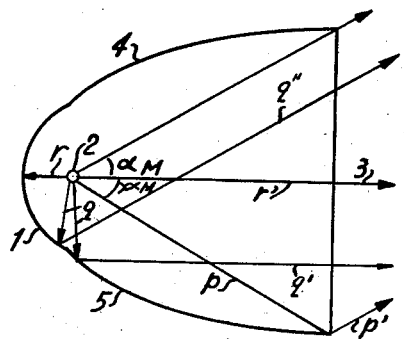
FIG. 1 is a section of this form of construction set perpendicularly to the source and parallel to the optical axis of the projector.
Figure 2:
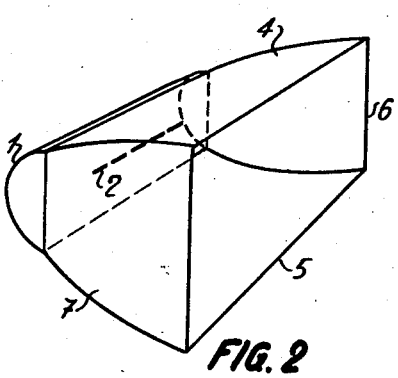
FIG. 2 is a view in perspective of this form of construction.

The projector shown in FIGS. 1 and 2 comprises a cylindrical reflecting cavity 1 located behind the luminous source, which is constituted by a discharge tube which can be assimilated to a segment of straight line 2. This discharge tube is disposed perpendicularly to the optical axis 3 of the projector.

This reflecting cavity 1 is connected by its edges to two reflectors 4 and 5, also cylindrical, with generatrices parallel to the axis of the source 2, these reflectors being disposed on opposite sides of the optical axis 3.

As shown in FIG. 2 the projector also comprises two lateral reflectors 6 and 7 disposed near to each extremity of the luminous source 2, these reflectors 6 and 7 being connected to the lateral edges of the cylindrical reflectors 4 and 5. In order to obtain the greatest possible efficiency an asymmetry in the luminous distribution of the beam according to the known principle of the placing out of centre of the lamp perpendicularly to the optical axis, asymmetry permitting of obtaining a uniform lighting even on surfaces which are oblique relatively to the optical axis, the cylindrical cavity covers an angle of 180° around the lamp.

In FIG. 1 there is indicated by $\alpha M$ one half of the angle of opening of the beam of the projector. All the beams issuing from the projector should be directed along a direction comprised between this angle $\alpha M$ and the optical axis 3, on opposite sides of this latter. When considering the surface to be illuminated disposed, with reference to FIG. 1, above the optical axis 3, that is to say only half of the total surface to be illuminated, it will be seen that this receives a beam of direct rays issued from the source 2, the angles of these beams are included between the optical axis 3 and the angle $\alpha M$. This surface also receives the rays reflected by the reflector 5, of which the shape is such that the incident rays at angles slightly greater than $-\alpha M$ are reflected at $p'$ at an angle substantially equal to $\alpha M$ and that the rays $q$ of incidence of approximately $-\pi/2$ radians are reflected in the direction of $q'$ substantially parallel to the optical axis. The illuminated surfaces under consideration also receives a beam of rays reflected by the lower part of the cavity 1, the shape of this cavity being such that the rays $q$ of incidence of approximately $-\pi/2$ radians are reflected into $q''$ under the angle $\alpha M$, whilst the rays $r$ directed parallel to the optical axis 3, but rearwardly, are reflected at $r'$ parallel to the optical axis.

It is known that a projector giving a uniform illumination on a surface perpendicular to its optical axis should have a luminous intensity $$J = \frac{J_0}{\cos^3 \alpha}$$

where $\alpha$ is the angle between the considered ray and optical axis, $J_0$ the luminous intensity for $\alpha=0$.

It follows that the curve of the reflectors 4 and 5, for example, is determined by taking a ray impinging on the reflector under consideration by making an angle $\beta$ with the optical axis, a corresponding ray leaving the projector at an angle $\alpha$, $\beta$ and $\alpha$ being such that there is obtained:

$$\frac{\int_0^\alpha \frac{J_0}{\cos^3 \alpha} d\alpha}{\int_0^{\alpha M} \frac{J_0}{\cos^3 \alpha} d\alpha} = \frac{\frac{\pi}{2}-\beta}{\frac{\pi}{2}-\alpha M} \qquad (I)$$

as the luminous intensity of the source may be maintained as constant in a plane perpendicular to its axis.

When $\alpha M$ is small, it is possible to show that the curve of the reflector is given by the differential equation $$\frac{dy}{dx} = tg\left[K \cdot \operatorname{arctg} \frac{y}{x} - \frac{\pi}{2}\right]$$

(for the cavity:

$$\frac{dy}{dx} = tg\left[K' \cdot \operatorname{arctg} \frac{y}{x}\right])$$

If $\alpha M$ is not small, the curve is determined graphically by dividing the angle formed by the beam of incidental rays on the considered reflector in $n$ sectors. There are then considered the $n$ angles $\beta_1$ determined by the bisectors of these $n$ sectors. The corresponding $\alpha_i$ are determined according to the Formula I which enables us to calculate the angles of the tangents to the curve with the optical axis at the corresponding points. It is then possible, starting at a given point, to construct step by step a polygon tangent to the curve and permitting of determining this latter.

The procedure is the same for the cavity.

The curvature of the lateral reflectors 6 and 7 cannot also be determined easily in such a manner as to obtain a uniform clarity in the other direction, by reason of the lengthening of the source in this direction. Consequently, it is determined by departing from the principle that all the light should be emitted at a certain angle which leads to taking for these reflectors an adequate parabolic curvature, and experience shows that then the illumination is also very uniform in this direction.

When the angle of opening of the beam is very small, the form of construction according to FIG. 1 leads to the employment of reflectors 4, 5, 6 and 7 of very large dimensions and not very compatible with an industrial construction. In this case it is advantageous to select the modification shown in FIG. 3 which permits of reducing the dimensions of the projector.

Figure 3:
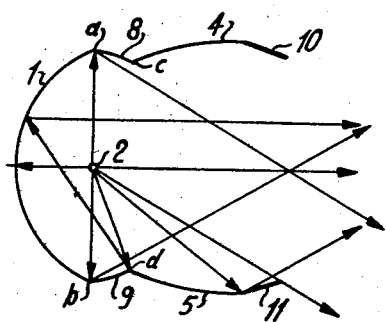
FIGURE 3 is a section similar to FIGURE 1 and shows another embodiment.

With reference to FIG. 3, the cavity presents, in a plane perpendicular to the axis of the source, that is to say between the points a and b, a larger dimension than the space separating the two edges c and d of the cylindrical reflectors 4 and 5 which are closer together. In this manner it is possible to maintain the two cylindrical reflectors 4 and 5 very close one to the other, without the cavity 1 being placed too close to the luminous source which would be embarrassing for questions for reasons of constructive order.

In this case, the edges a and b of the cavity 1 are connected to the edges c and d of the cylindrical reflectors 4 and 5 by surface elements 8 and 9, which may be opaque in such a manner as to intercept the direct rays falling into this region, but there is the advantage of making said elements 8 and 9 reflective and calculating in such a manner that the light collected by them is directed on to the cavity, this latter distributing it on the surface to be illuminated. Further, the edges spaced further from the source of the reflectors 4 and 5 may be provided with screens such as 10 and 11 adapted to limit the opening of the beam of direct rays, whilst avoiding imparting a too large length to the reflectors 4 and 5.

There exist on the market incandescent lamps having a rectilinear filament which may naturally be used instead and in place of discharged tubes which have been given as example of a luminous source.

I claim:
1. A projector adapted to give substantially uniform lighting on a rectangular surface without any emission of light outside said surface comprising, in combination, a luminous source assimilable to a segment of straight line perpendicular to the optical axis of the projector, reflecting cylindrical cavity means for collecting rays emitted by said source in a dihedra having an opening of 180°, said cylindrical cavity means being positioned to the rear of said luminous source, the generatrices of said cylindrical cavity means being parallel to the axis of said luminous source, two spaced-apart cylindrical reflectors, said two cylindrical reflectors being positioned on opposite sides of the optical axis of the projector, the respective generatrices of said two cylindrical reflectors being parallel to the axis of said luminous source, and two lateral reflectors positioned near each extremity of said luminous source and connected to the respective lateral edges of said cylindrical reflectors, said cylindrical cavity means having a curvature and each of said spaced-apart cylindrical reflectors having a curvature, said curvatures being such that the beam of light rays reflected by said cylindrical cavity means and the beam of light rays reflected by each of said cylindrical reflectors are superposed on each other and on the unreflected beams of light rays issued from said luminous source, some of said reflected beams of light rays being divergent, whereby there is obtained substantially uniform lighting on the surface illuminated by said projector.

2. A projector adapted to give substantially uniform lighting on a rectangular surface without any emission of light outside said surface comprising, in combination, a luminous source assimilable to a segment of straight line perpendicular to the optical axis of the projector, reflecting cylindrical cavity means for collecting rays emitted by said source in a dihedra having an opening of 180°, said cylindrical cavity means being positioned to the rear of said luminous source, the generatrices of said cylindrical cavity means being parallel to the axis of said luminous source, two spaced-apart cylindrical reflectors, said two cylindrical reflectors being positioned on opposite sides of the optical axis of the projector, the respective generatrices of said two cylindrical reflectors being parallel to the axis of said luminous source, and two lateral reflectors positioned near each extremity of said luminous source and connected to the respective lateral edges of said cylindrical reflectors, said cylindrical cavity means having a curvature and each of said spaced-apart cylindrical reflectors having a curvature, said curvatures being such that the beam of light rays reflected by said cylindrical cavity means and the beam of light rays reflected by each of said cylindrical reflectors are superposed on each other and on the unreflected beam of light rays issued from said luminous source, some of said reflected beams of light rays being divergent, whereby there is obtained substantially uniform lighting on the surface illuminated by said projector, the curvature of each of said cylindrical reflectors with respect to the plane perpendicular to the axis of the luminous source being determined graphically by the formula $$\frac{\int_0^\alpha \frac{J_0}{\cos^3 \alpha} d\alpha}{\int_0^{\alpha M} \frac{J_0}{\cos^3 \alpha} d\alpha} = \frac{\frac{\pi}{2}-\beta}{\frac{\pi}{2}-\alpha M}$$

and the equation of the curvature of each of said cylindrical reflectors with respect to the plane perpendicular to the axis of the luminous source when $\alpha M$ is small being $$\frac{dy}{dx} = tg\left[K \arctg \frac{y}{x} - \frac{\pi}{2}\right]$$

and the equation of the curvature of said reflecting cylindrical cavity means being $$\frac{dy}{dx} = tg\left[K' \arctg \frac{y}{x}\right]$$

$\alpha$ being the angle between the considered ray and the optical axis,
$J_0$ being the luminous intensity for $\alpha = 0$,
$\alpha M$ being one half of the angle of opening of the beam of the projector,
$\beta$ being the angle between a ray impinging on the reflector under consideration and the optical axis, and
K and K' being constants.

References Cited in the file of this patent

UNITED STATES PATENTS

| | | |
|---|---|---|
| 1,238,483 | Benjamin | Aug. 28, 1917 |
| 1,598,563 | Ducate | Aug. 31, 1926 |
| 2,003,342 | Cavanaugh | June 4, 1935 |
| 2,013,721 | Waterbury | Sept. 10, 1935 |

FOREIGN PATENTS

| | | |
|---|---|---|
| 13,311 | Great Britain | Feb. 19, 1914 |
| 336,779 | Great Britain | Oct. 23, 1930 |
| 340,522 | Great Britain | Dec. 24, 1930 |
| 429,357 | Great Britain | May 29, 1935 |
| 829,629 | Germany | Jan. 28, 1952 |